J. W. HUGHES.
PISTON RING.
APPLICATION FILED APR. 24, 1922.
1,438,763. Patented Dec. 12, 1922.
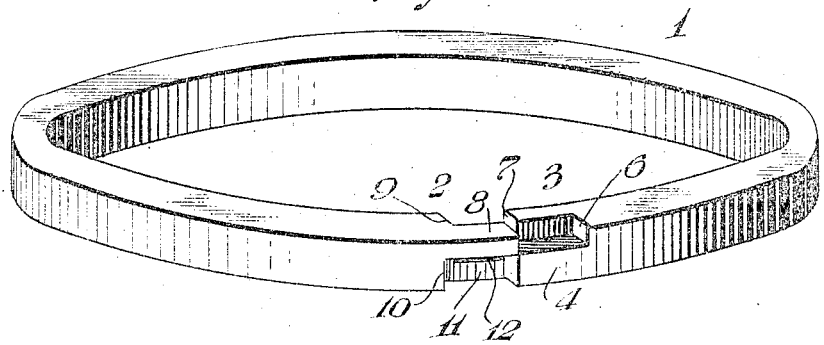
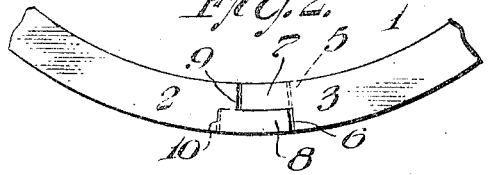 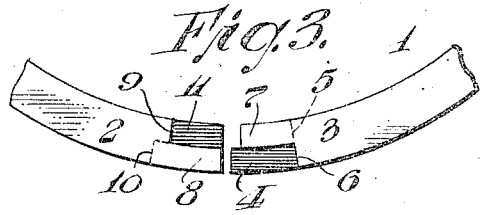
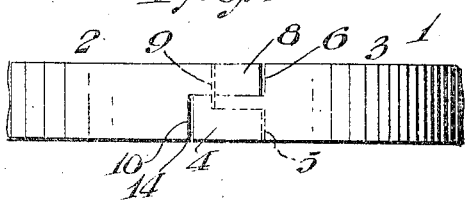 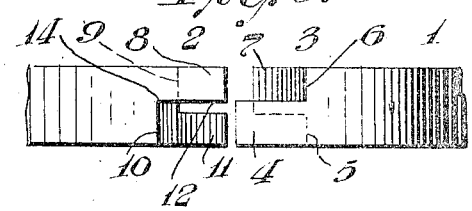
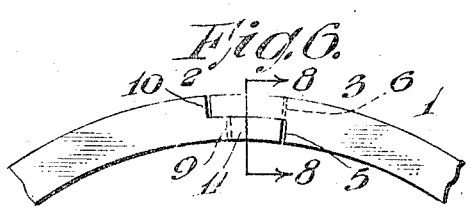 
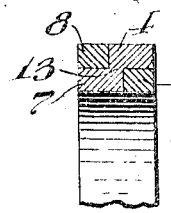
INVENTOR:
James W. Hughes
BY
Shedersheim Fairbanks
ATTORNEY Patented Dec. 12, 1922.

1,438,763

UNITED STATES PATENT OFFICE.

JAMES W. HUGHES, OF WYNCOTE, PENNSYLVANIA, ASSIGNOR TO WILLIAM H. STEHLE, OF PHILADELPHIA, PENNSYLVANIA.

PISTON RING.

Application filed April 24, 1922. Serial No. 556,357.

*To all whom it may concern:*

Be it known that I, JAMES W. HUGHES, a citizen of the United States, residing at Wyncote, county of Montgomery, State of Pennsylvania, have invented a new and useful Piston Ring, of which the following is a specification.

My present invention comprehends a novel construction of a piston ring of the expansion type.

It further comprehends a novel piston ring wherein the juxtaposed ends are provided with a novel construction and arrangement of projections and recesses whereby the juxtaposed ends of the ring are interlocked in every direction and are self sealing in every direction.

It further comprehends a novel construction of a piston ring wherein two projections of different lengths are provided on diagonally opposite corners of one end of one ring which seat in recesses of different lengths to correspond with the lengths of the projections.

Other novel features of construction and advantage will hereinafter more fully appear in the detailed description.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in perspective, a piston ring, embodying my invention.

Figure 2 represents a side elevation of the juxtaposed ends of the piston ring in closed position.

Figure 3 represents a side elevation similar to Figure 2 but showing the juxtaposed ends in open position.

Figure 4 represents a top plan view of a portion of the ring with the juxtaposed ends in closed position.

Figure 5 represents a top plan view similar to Figure 4 but showing the juxtaposed ends in their open position.

Figure 6 represents a side elevation of the juxtaposed ends of the piston ring in closed position illustrating the opposite side from that seen in Figure 2.

Figure 7 represents a side elevation similar to Figure 6 but showing the juxtaposed ends of the ring in their open position.

Figure 8 represents a section on line 8—8 of Figure 4.

Similar numerals of reference indicate corresponding parts.

Referring to the drawings, 1 designates a piston ring embodying my invention which is provided with the interlocking end portions 2 and 3, respectively. The end portion 3 is provided at one side with a side tongue or projection 4, the inner or under face of which is cut away to form a recess 5. The projection 4 is flush with one side wall of the ring and with the outer periphery of the ring. The outer periphery of the ring on the opposite side is cut away on its top face to form the side top recess 6 and these recesses 5 and 6 contribute to form a bottom side tongue or projection 7 which is of less length than the length of the projection 4. The opposite end of the ring is provided with the outer or upper side tongue or projection 8 which is flush with the periphery of the ring and a side wall of the ring. The inner face of the ring beneath the projection 8 is cut away to form the inner or bottom recess 9.

The top face of the end 2 is cut away to form a recess 10 and the recesses 9 and 10 contribute to form the lower side tongue or projection 11 which throughout a portion of its length is separated from the projection 8 by means of a slot 12. The projection 8 is narrower than the projection 4 so that the recess 11 is wider than the recess 6. It will thus be seen that when the recesses are formed in the opposite sides of the juxtaposed ends of the piston ring the slot 12 will be formed at the same operation, and especial attention is called to the fact that the inner or left hand terminal of the seat 12, as seen in Figure 1 is at a distance from the left hand wall of the recess 10, so that an effective pocket or area is formed so as to permit the lapping of the side tongue 4 and the sealing of the ring when the latter is compressed substantially as seen in Figures 4 and 6.

The purpose of the slot 12 is to receive the solid portion joining the projections 4 and 7, as indicated at 13, see Figure 8, it being seen that the recesses 5 and 6 are noncommunicating while the recesses 9 and 10 are communicating due to the presence of the slot 12. Attention is directed to the fact that the projections 8 and 11 have their free ends terminating in the same radial plane, while the projections 4 and 7 do not terminate in the same radial plane, the termination of the projection 4 being posterior to the termination of the projection 7, in order that it may overlap the projection 11 sufficiently to close the slot 12 when the juxtaposed ends of the ring are closed or, in other words, when the ring is in its operative position with respect to a piston and its cylinder, as illustrated in Figures 2, 4 and 6.

The diagonally opposed recesses 9 and 10 are communicating while the diagonally opposed recesses 5 and 6 are noncommunicating. The rear portion of the recess 10 forms a pocket 14 when the ring is closed which is noncommunicating with the recess 9.

I am aware that it has heretofore been proposed in the patent to Campbell No. 1,132,762, to form a piston ring with two diagonally opposite projections on one end of said ring which form two diagonally opposite noncommunicating recesses, with the juxtaposed ends of the ring formed in the same manner, and the two projections are substantially the same length at each end of the ring.

My present invention is clearly differentiated from the Campbell patent, aforesaid, since in my invention the diagonally opposed recesses on one end of the ring are noncommunicating, while the diagonally opposed recesses on the juxtaposed end of the ring are intercommunicating. If the recesses are noncommunicating at each end of the ring, then it would be impossible to close the ring because if the projections on one end of the ring are joined together by any material, no matter how small in section, as shown, for example, at 13, in Figure 8, in order to make the recesses 5 and 6 noncommunicating, then the projections 8 and 11 must be separated equal to the amount of material 13, in order to permit the projections 8 and 11 to be seated in the recesses 5 and 6.

In applicant's device the projections at one end of the ring terminate in the same radial plane while the projections at the juxtaposed ends do not terminate in the same radial plane.

It will be apparent that my present construction of ring is interlocking and self sealing in every direction since the greater the radial pressure in either direction or lateral pressure in either direction the tighter the seal which is obtained and where in the claims I refer to the term "self sealing", I mean a construction which will automatically seal under radial pressure in either direction and lateral pressure in either direction.

It will now be apparent that I have devised a novel and useful piston ring which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. An integral packing ring of an expansive construction having a joint composed of two projections diagonally opposite and of practically the same length on one end of said ring, and made to fit into corresponding pockets of equal depths on the other end of said ring, said pockets being formed on the other end of said ring by diagonally opposed projections of unequal lengths.

2. An integral piston ring having an unbroken inner periphery and having on one end a side tongue and side recess of the same length and a slot through the recessed portion having its inner wall terminating a distance from the inner wall of said recess forming a pocket, said ring having on its other end a side tongue and side recess aligning with the first mentioned recess and tongue respectively and of different lengths, said latter tongue being longer than its adjacent recess and overlapping and closing said slot and fitting in said pocket, when said ring is compressed, to form a sealed joint against radial and lateral pressure in every direction.

3. An integral piston ring, having in one end an upper, outer, side tongue 8 and a side recess 10, said recess and tongue being of substantially the same length and said recessed portion 10 having a slot 12 therethrough, a side wall of which is coincident with the inner wall of said side tongue, and the inner end wall of said slot terminating a short distance from the inner wall of said side recess, whereby a pocket 14 is formed, said side tongue 8 having an under cut recess 9 whose inner terminus is substantially coincident with the inner end wall of said slot, whereby a lower side tongue 11 is formed separated for a portion of its length from said upper side tongue by said slot, said tongues 8 and 11 being of substantially the same length, said ring having in its other juxtaposed end a side tongue 4 in alignment with and juxtaposed to said recess 10, said tongue having a bottom recess 5 thereunder and an upper side recess 6 and being of greater length than either said side or bottom recesses, whereby a bottom side tongue 7 is formed shorter than said tongue 4 so that said tongue 4 overlaps said recess 10 and closes said slot 12, said tongue 11 engages said recess 5 and said tongue 7 engages said recess 9, thereby forming, when the ring is compressed, an interlocked joint sealed against radial and lateral pressure in every direction.

JAMES W. HUGHES.

Witnesses:
H. S. FAIRBANKS,
C. D. McVAY.